United States Patent [19]

Mattson

[11] 3,845,282

[45] Oct. 29, 1974

[54] APPARATUS AND METHOD FOR UNAMBIGUOUS COUNTER READING

[75] Inventor: Clyde E. Mattson, Waukesha, Wis.

[73] Assignee: Kearny & Trecker Corporation, Milwaukee, Wis.

[22] Filed: Feb. 8, 1974

[21] Appl. No.: 440,805

Related U.S. Application Data

[63] Continuation of Ser. No. 285,814, Sept. 1, 1972, abandoned.

[52] U.S. Cl. ........ 235/92 EA, 235/92 CA, 235/92 R

[51] Int. Cl. .......................................... H03k 21/18

[58] Field of Search .................. 235/92 EA, 92 CA; 340/146.1 BE

[56] References Cited

UNITED STATES PATENTS

| | | | |
|---|---|---|---|
| 3,196,258 | 7/1965 | Belcastro | 235/92 CA |
| 3,621,391 | 11/1971 | Miller | 235/92 EA |
| 3,683,345 | 8/1972 | Faulkes et al. | 235/92 CA |

*Primary Examiner*—Gareth D. Shaw
*Assistant Examiner*—Joseph M. Thesz, Jr.
*Attorney, Agent, or Firm*—Cyril M. Hajewski; Donald E. Porter

[57] ABSTRACT

A binary counter is read into a register at an arbitrary time and then read again into another register a short time later. If the two readings are equal, the reading is accepted as an accurate reading of the counter. If the two readings are unequal, one or more successive readings are made, spaced a short time apart, and each is compared with the previous reading until equal readings are recognized.

5 Claims, 3 Drawing Figures

PATENTED OCT 29 1974 3,845,282
Fig. 1
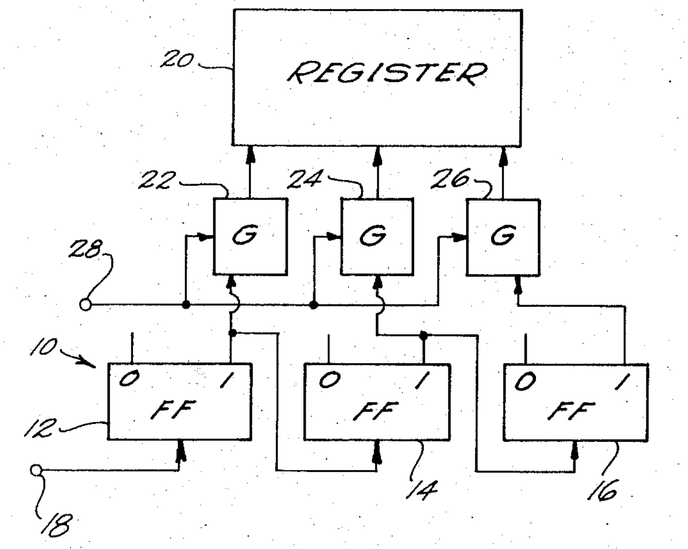
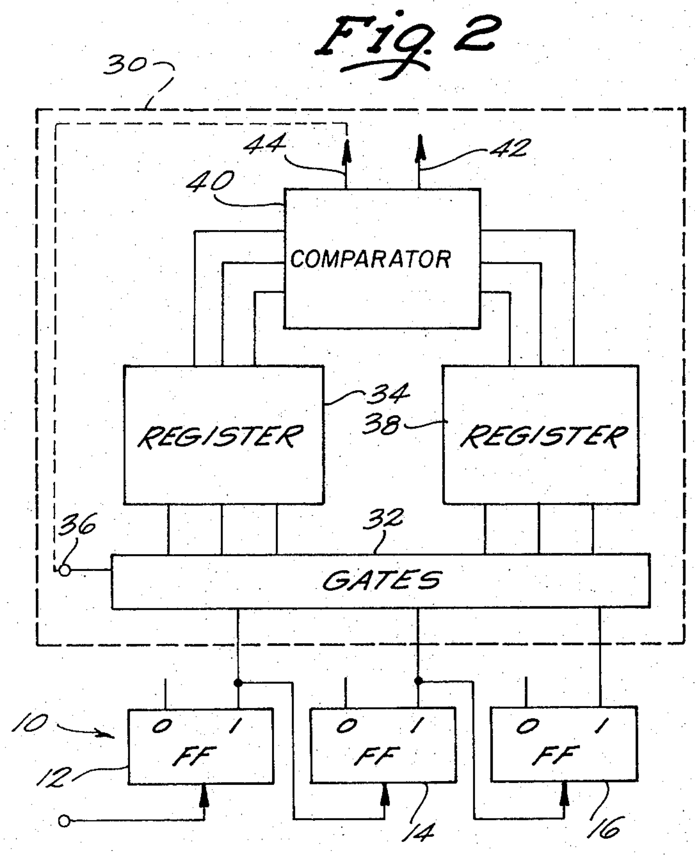
Fig. 3
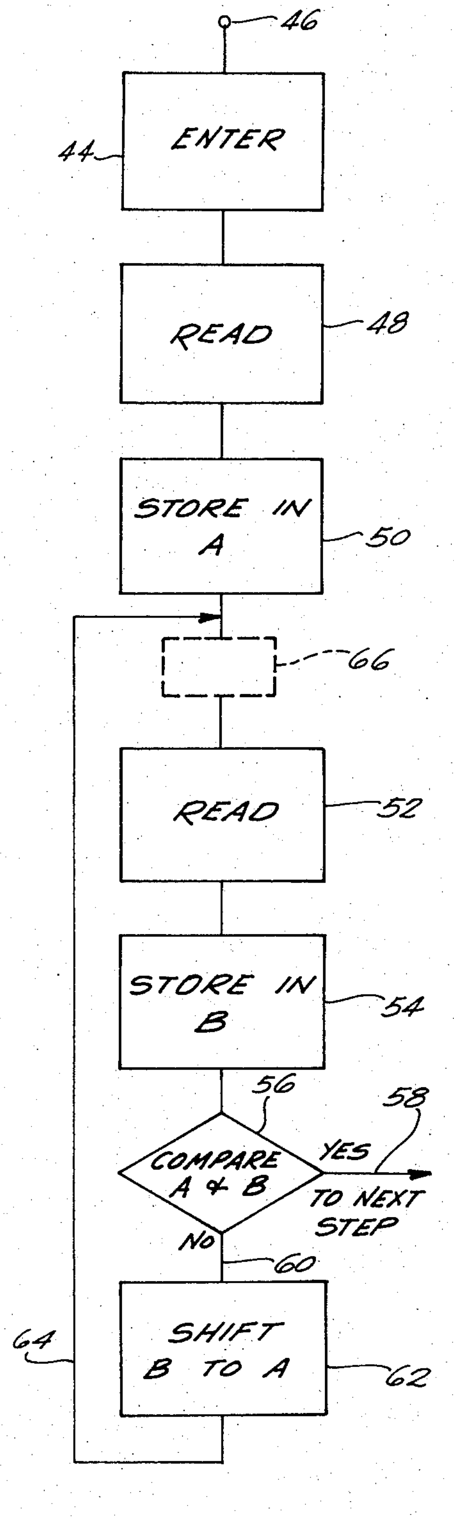

APPARATUS AND METHOD FOR UNAMBIGUOUS COUNTER READING

This is a continuation of application Ser. No. 285,814, filed Sept. 1, 1972 now abandoned.

Background of the Invention

The present invention relates to apparatus and a method for securing an error-free reading of the content of an electronic digital counter and, in particular, to apparatus and a method for reading such a counter unambiguously with the minimum amount of apparatus.

In many fields, electronic digital counters, and especially binary counters, are employed to keep track of the cumulative sum of a pulse train which may, for example, originate with a resolver, a pulse generator, or the like. It is a characteristic of certain digital counters that all of the orders of the counter do not change their state simultaneously in response to receipt of a pulse which brings the cumulative total of the counter to a state in which lower orders are decreased and higher orders are increased. For example, if the counter maintains a representation of a binary 1, or 01, the next pulse received by the counter changes the representation to a binary 2, or 10. Before the second order changes from a 0 to a 1, however, the first order changes from 1 to 0 so that, momentarily, the counter registers a binary 0 before registering a binary 2. If the content of the counter is inspected during this period, an erroneous reading results. This same kind of ambiguity results from the operation of the counter each time an additional count causes the counter to assume a condition in which any order other than the first order changes from 0 to 1.

In some cases, a large group of gates is employed, interconnected among the various orders of the counter to inhibit reading the counter during the period when an ambiguous reading may result. These approaches, while operating satisfactorily from a functional standpoint, require the use of relatively large quantities of equipment in the way of gates and auxiliary circuitry. It is desirable to minimize the number of gates required to accomplish the purpose of reading the counter, without introducing any ambiguities in reading.

Accordingly, it is a principal object of the present invention to provide an apparatus and a method for effecting the reading of a digital counter with a minimum number of gates, and without ambiguity as to the content of the counter.

This and other objects of the present invention will become manifest upon an inspection of the accompanying drawings and the following description.

SUMMARY OF THE INVENTION

In one embodiment of the present invention, a digital computer is used to perform the steps of reading the contents of a counter into a register, making a second reading of the counter into a second register after a predetermined interval, comparing the first and second readings, and executing a program branch in response to whether the two readings are found to be identical. If the two readings are identical, a branch to the next sequential program step is selected. If the two readings are not identical, a third reading is taken and compared with the second reading. Additional readings are made, if necessary, until two successive identical readings are recognized, after which the next sequential program step is executed.

DESCRIPTION OF THE DRAWINGS

Reference will now be made to the accompanying drawings in which FIG. 1 is a functional block diagram of an electronic binary counter with means for reading the counter, such as employed in the prior art;

FIG. 2 is a functional block diagram of apparatus constructed in accordance with the present invention; and FIG. 3 is a flow chart of a program for a digital computer in accordance with the present invention.

DESCRIPTION OF THE INVENTION

Referring now to FIG. 1, an electronic binary counter 10 is illustrated composed of flip flops 12, 14 and 16 connected in cascade with an output of each connected to the input of each succeeding flip flop. Pulses to be counted are applied to a terminal 18, which is connected to the input of the first flip flop.

Each of the flip flops 12, 14 and 16 has two outputs and respectively represent the first, second and third binary orders. When the 1 output of the flip flop 12 is high, a binary 1 is represented; when the 1 output of the flip flop 14 is high, binary 2 is represented; when the 1 output of the flip flop 16 is high, a binary 4 is represented, and so on. Initially, the 0 outputs of all of the flip flops are high to represent a binary 0, and the 1 outputs of all of the flip flops are low. The first pulse changes the state of the flip flop 12 so that its 1 output goes high and its 0 output goes low, thereby representing a binary 1. The second pulse also changes the state of the flip flop 12 so that the 0 output again goes high and the 1 output goes low. The 1 output of the flip flop 12 is connected to the input of the flip flop 14, however, so that when the flip flop 12 changes its state it triggers a succeeding change of state of the flip flop 14, whereby a binary 2 is represented. The state change of the flip flop 14 follows, by a small interval, the state change of the flip flop 12, so that there is a short time during which the flip flop 12 has been switched twice, but the flip flop 14 is not yet switched once. If the content of the counter 10 is read during this time, an erroneous reading results.

Similarly, when the state of the counter 10 changes from a binary 3 to a binary 4, all three flip flops change state successively, so that the ambiguous interval is slightly longer. If more flip flops are connected to the output of the flip flop 16, to increase the radix of the counter, the duration of the ambiguous interval is dependent upon the number of the flip flops employed.

The content of the counter 10 is read into a register 20, when desirable, through a group of gates 22, 24 and 26, each of which is connected from a 1 output of its respective flip flop to the input of an individual order of the register 20. The gates 22, 24 and 26 are energized to cause a reading to be made when a pulse is applied to a terminal 28, which terminal is connected to a second input of each of the gates.

Accuracy is frustrated if the counter 10 is read during an ambiguous interval. Accordingly, it has been customary in the prior art to provide an additional network, connected to the apparatus of FIG. 1, including a plurality of gates which sense whether any of the flip flops of the counter 10 is in a transition stage or whether there is an incompleted carry being represented. If so, the gates 22, 24 and 26 are disabled until after the end of the ambiguous interval. This approach, however, requires additional apparatus needed to form such a network.

FIG. 2 illustrates in functional block diagram form apparatus according to the present invention for reading the content of the counter 10. The counter 10 is constructed in an identical manner as described in FIG. 1, but no gates or register such as 20-26 are dedicated specifically to the use of the counter 10. Instead, all of the apparatus connected with the counter 10 is contained within a digital computer 30. As well known to those skilled in the art, most of the components of the digital computer 30 are not "hard wired" in the sense that they are used to accomplish a single result. On the contrary, the connections among the components of the computer are dictated by the program of the computer, and connections which are made on command of the computer's program are referred to as "soft wired" connections, since they are made in response to the software or stored program of the computer. The components are connected to enable the computer to accomplish a desired result and, thereafter, they are quickly disassembled.

The computer 30 contains a plurality of gates 32 connected to the 1 output of each of the flip flops 12, 14 and 16, and the gates 32 are activated to cause the content of the counter 10 to be read into a register 34 when a control terminal 36 is energized. The specific details of the gates 32 and 34 are not illustrated, as they may be identical to the corresponding gates and register 20–26 illustrated in FIG. 1, except that, as components of the computer 30, they may be called upon to perform different operations at other times. The register 34, FIG. 2, is typically not a register in the sense of a physical device such as illustrated in FIG. 1, but is, on the contrary, a location in the computer's storage or memory designated for receiving input data. In a succeeding operation, the gates 32 are again energized to read the content of the counter 10 into a second register 38, which is another storage location in the computer, in response to energization of the terminal 36. Different storage locations are designated for the registers 34 and 38 so that they can simultaneously manifest two separate quantities.

Immediately following the reading of the counter 10 for the second time, the contents of the registers 34 and 38 are compared in a comparator unit 40 which issues an output signal on a line 42 if the comparison reveals that the contents of the two registers, 34 and 38, are found to be identical. The presence of a signal on the line 42 causes the computer 30 to resume its normal course of operations in which the content of either the register 34 or 38 is employed in a subsequent calculation. If the contents of the two registers are not identical, however, an output signal is produced on a line 44 which causes the content of the register 34 to be erased and replaced by the content of the register 38, after which a new reading from the counter 10 is entered into the register 38.

The apparatus illustrated in FIG. 2 may be entirely separate from the remaining components of the digital computer 30, if desired. However, if a digital computer 30 is employed, no additional apparatus is required beyond the flip flops of the counter 10, because the gates and registers are components of the computer 30.

Referring now to FIG. 3, there is illustrated a program by which the digital computer 30 may be controlled to perform the operations illustrated at FIG. 2. The program is entered via step 44, which causes an interruption of the program being performed by the computer. In response to an interrupt condition, the branch 46 is selected and control of the program is passed to step 48. In step 48, the content of the counter 10 is read into the input buffer register of the computer, and control passes to step 50 in which the content of the input buffer register is stored at address location A.

Control passes to the next step 52 in which the content of the counter 10 is again read into the buffer storage register, and in step 54 the content of the storage register is stored at address location B. Then control passes to a decision unit 56 in which the contents of address locations A and B are compared. If these quantities are found to be equal, control passes to the executive program by way of branch 58 to perform the next program step in the normal sequence, which may use the quantity read from the counter 10 in a calculation.

If the two quantities are not equal, however, branch 60 is selected and step 62 moves the quantity theretofore stored in memory location B into memory location A, displacing the first reading of the counter 10. Then control is returned in step 52 by way of branch 64. The sequence included in steps 52, 54 and 56 is reiterated as many times as necessary until eventually two successive readings of the counter 10 are found to be equal, in which case branch 58 is selected and control passes to the next program step in the normal sequence.

The time required to perform two successive readings of the counter 10 depends upon the construction of the computer being used. It is important that the two successive readings be spaced by time intervals greater than the ambiguous interval which exists in the counter, so that two successive readings cannot be made within the same ambiguous interval. Normally, the ambiguous interval of a counter is very short in comparison with the time required to perform three of the program steps illustrated in FIG. 3, so that two successive readings cannot be found to be equal in the step 56 when one of such readings is made during an ambiguous interval. In the event that a construction of the counter 10 is used having an excessively long ambiguous interval in relation to the program execution time, it may be necessary to insert a delay step 66 in the program of FIG. 3 immediately prior to the step 52, so that every reading of the counter 10 after the first such reading is delayed by a sufficient period to prevent successive counter readings from being made during a single ambiguous interval.

Various ways of accomplishing the delay required by the step 66 are known to those skilled in the art. One convenient way of accomplishing the delay is to cause the step 66 to set a negative quantity into a storage location and increment such quantity positively with clock pulses, comparing the quantity with zero each time it is incremented, and continuing to increment the counter until a zero is detected, after which the step 52 is performed. In this manner the delay between successive readings is equal in length to the number of clock pulse periods represented by the negative quantity.

By means of the program illustrated in FIG. 3, an unambiguous read-out of the counter 10 is at all times effected before control can pass via branch 62 to the next normal step in the computer program. Successive readings of the counter 10 are of course made sufficiently rapidly that the results thereof are identical except during an ambiguous interval. No additional apparatus is required for the counter 10 beyond normal use of gates similar to the gates 22, 24 and 26 for connecting the counter 10 to the input buffer of the register of the computer. Accordingly, the use of the present invention permits the content of the counter 10 to be read unambiguously by means of a digital computer without requiring any additional apparatus associated with that counter.

Although the program of FIG. 3 effects a comparison of each reading with the immediately previous reading, it is also within the scope of the present invention to omit step 62 and return control from branch 60 directly to step 48. In this event, a comparison is made of successive pairs of readings until the branch 58 is selected.

The following program listing is designed for use with a PDP8 data processor marketed by Digital Equipment Corp., and carries out a program which is exemplary of the present invention.

```
                           TEMPORARY IOBB INPUT PROGRAM
05023 007000    SVIN,      NOP                /ENTRY POINT.
05024 006514               6514
05025 003164               DCA ITEMPϕ
05026 006514               6514
05027 007041               CIA
05030 001164               TAD ITEMPϕ
05031 007440               SZA
05032 005224               JMP  SVIN+1
05033 001164               TAD ITEMPϕ
05034 000256               AND No. 3777       /AND WITH 3777.
05035 007000               NOP
05036 005623               JMP I SVIN         /RETURN.
```

The present invention may be employed to read a counter whenever such counter successively counts pulses applies to an input thereof, registering the cumulative total of such pulses.

What is claimed is:

1. For use in effecting an unambiguous reading of the number stored in a binary counter to avoid errors caused by the counter changing its state during the reading, the combination comprising; transfer means interconnected between individual orders of said binary counter and a first register, means for selectively activating said transfer means to transfer a representation of the instantaneous condition of said binary counter into said first register for registering a first reading, means for selectively interconnecting said transfer means between said orders of said counter and a second register, means for selectively activating said transfer means to transfer a representation of the instantaneous condition of said counter into said second register for registering a second reading immediately after registration of said first reading, comparator means operative subsequently to the reading of said counter into said second register for comparing the content of said first and second registers, means connected to said comparator means and selectively operative in response thereto to activate said transfer means immediately after the registration of said second reading to make a third transfer of the condition of said counter to one of said registers only if the condition of said counter during said first transfer is not equal to the condition of said counter during said second transfer, and means connected to transmit one of two consecutive identical readings of said counter for use as the desired unambiguous reading of the counter.

2. The method of unambiguously reading the "number stored in a binary counter to avoid errors caused by the counter changing its state during the reading" comprising the steps of effecting a first reading of the content of said counter, storing the result of said first reading, effecting a second reading of the content of said counter immediately after the completion of said first reading, storing the result of said second reading, comparing the results of said first and second readings, and effecting a third reading of said counter in response to said comparison immediately after the completion of said second reading only when the results of said first and second readings are not identical, and transmitting one of two consecutive identical readings of said counter as the desired unambiguous reading of the counter.

3. The method according to claim 2 wherein said second reading is effected a predetermined time after said first reading, said predetermined time being longer than the period during which said counter may be in a transient condition.

4. The method according to claim 2 including the step of comparing the results of said second and third readings, and effecting a fourth reading of said counter if the results of said second and third readings are not identical.

5. The method according to claim 4 including the step of manifesting an output signal in response to the operation of said comparator in comparing the results of any two successive readings of said counter, when said results are identical.

* * * * *